United States Patent [19]

Tsutsumi et al.

[11] Patent Number: 4,624,985
[45] Date of Patent: Nov. 25, 1986

[54] PAPER COATING COMPOSITION COMPRISING PVA CONTAINING ACETOACETYL GROUP AND A PIGMENT

[75] Inventors: Shuji Tsutsumi, Kusatsu; Yoshirou Yamaguchi, Hirakata; Satoru Kageyama, Ikeda, all of Japan

[73] Assignee: Nippon Gohsei Kagaku Kogyo Kabushiki Kaisha, Osaka, Japan

[21] Appl. No.: 809,903

[22] Filed: Dec. 17, 1985

[30] Foreign Application Priority Data

Dec. 21, 1984 [JP] Japan ................................ 59-271505

[51] Int. Cl.$^4$ .......................... C08L 29/04; B41M 3/12
[52] U.S. Cl. ..................................... 524/803; 162/135; 427/150
[58] Field of Search ........................ 524/803; 427/150

[56] References Cited

U.S. PATENT DOCUMENTS 4,350,788  9/1982  Shimokawa et al. ............... 524/309
4,513,301  4/1985  Takayama et al. ................. 428/514

FOREIGN PATENT DOCUMENTS 0111335 12/1982 European Pat. Off. .
0185195 11/1982 Japan .
0245591 12/1982 Japan .
0024435  2/1983 Japan .
0056894  4/1983 Japan .
0915896  8/1984 Japan .
0023097  2/1985 Japan .

Primary Examiner—Herbert J. Lilling
Attorney, Agent, or Firm—Antonelli, Terry & Wands

[57] ABSTRACT

A paper coating composition comprising a polyvinyl alcohol resin containing acetoacetyl group prepared in the presence of a pigment having a pH of not more than 8. The composition of the invention gives heat sensitive recording paper which has increased color density, excellent plasticizer resistance and low adhesiveness to a thermal print head.

3 Claims, No Drawings

PAPER COATING COMPOSITION COMPRISING PVA CONTAINING ACETOACETYL GROUP AND A PIGMENT

BACKGROUND OF THE INVENTION

The present invention relates to a paper coating composition suitably employed for improving properties of various papers such as printability, and more particularly to a paper coating composition employed for improving printability, plasticizer resistance, oil resistance, solvent resistance and water resistance of a heat sensitive recording paper.

A recording process utilizing heat has been utilized more and more because it is advantageous in comparison with a conventional recording process which requires inks, development and fixed process. Particularly, the thermal recording paper having a heat sensitive layer in which a color forming material such as Crystal Violet lactone and a color developing material such as a phenol compound are included and they are thermally reacted to develop a color, is highly estimated and has been put to practical use.

As a binder for the above-mentioned color forming material and color developing material, a water-soluble binder such as polyvinyl alcohol (hereinafter referred to as "PVA") is widely employed. However, the PVA has defects that dust of PVA may make dirty a thermal print head during a long time recording and that the printed letter disappear and the recording paper grows sticky in contact with water or plasticizers. Recently, in order to solve the problems, there has been proposed a recording paper in which acetoacetyl group-containing PVA is employed as a binder of the heat sensitive layer [Japanese Unexamined Patent Publication (Tokkyo Kokai) No. 181687/1983], a recording paper in which a protective layer composed of a carboxylic acid-modified PVA or acetoacetyl group-containing PVA is placed on the heat sensitive layer (Tokkyo Kokai No. 106995/1984), and the like, but there is a room for various improvements.

Particularly, the increase of the color density is not always remarkable in addition to demands of more improvements in the plasticizer resistance, oil resistance and solvent resistance. Also there has been requested a paper which does not cause the printed letters to disappear for a long time, even if the recording papers are in contact with plastic films or sheets including a large amount of plastisizer.

An object of the invention is to provide a paper coating composition which can solve the abovementioned problems.

The above and other objects of the present invention will become apparant from the description hereinafter.

SUMMARY OF THE INVENTION

In accordance with the present invention, there is provided a paper coating composition comprising an acetoacetyl group-containing PVA prepared in the presence of a pigment having a pH of not more than 8.

DETAILED DESCRIPTION

In the present invention, the PVA included in the paper coating composition must be prepared in the presence of specific pigments. It has been known to employ a mixture of acetoacetyl group-containing PVA and a pigment such as clay or calcium carbonate as a binder of heat sensitive layer or a protective layer of the heat sensitive recording paper, but such a method by mere mixing is hard to give excellent effects as obtained in the present invention.

A method for coexisting the pigment with the PVA is not limited. For instance the pigment is made to exist at the time when a vinyl ester such as vinyl acetate is polymerized, at the time when polyvinyl ester is hydrolysed, or at the time when the PVA is aceto-acetylated by reacting with diketene. Among them, it is preferable that the pigment exists at the time when the vinyl ester is polymerized, from the points of effective preparations and properties of the obtained paper coating composition.

The PVA employed in the invention includes not only partly hydrolysed polyvinyl acetate or completely hydrolysed polyvinyl acetate but also hydrolysed copolymer of vinyl acetate and a monomer copolymerizable with vinyl acetate, e.g., olefins such as ethylene, propylene, isobutylene, $\alpha$-octene, $\alpha$-dodecene or $\alpha$-octadecene; an unsaturated acid such as acrylic acid, methacrylic acid, crotonic acid, maleic acid, maleic anhydride or itaconic acid, a salt thereof, a monoalkyl ester thereof or a dialkyl ester thereof; a nitrile such as acrylonitrile or methacrylonitrile; an amide such as acrylamide or methacrylamide; an olefin sulfonic acid such as ethylenesulfonic acid, allylsulfonic acid or methallylsulfonic acid or a salt thereof; an alkyl vinyl ether, a vinylketone, N-vinylpyrrolidone, vinyl chloride, vinylidene chloride, but the PVA is not limited thereto.

It is preferable that the PVA used in the invention has an average degree of hydrolysis of 70 to 100% by mole, more preferably 85 to 100% by mole, and an average degree of polymerization of 100 to 3,000, more preferably 400 to 2,000.

Optional methods can be carried out for introducing acetoacetyl group into the PVA. It is preferable that diketene is reacted with the PVA, or the PVA is subjected to ester-interchange reaction with acetoacetic acid ester.

The content of acetoacetyl group is from 0.05% by mole based on the PVA to the maximum within range where the obtained acetoacetyl group-containing PVA is water-soluble. Generally, it is preferable that the content is from 0.1 to 20% by mole, more preferably 0.5 to 10% by mole. When the content of acetoacetyl group is less than 0.05% by mole, the effect of the invention is hard to obtain, and if the content is more than 20% by mole, the desired effects are hardly improved.

The pigment used in the invention must have a pH of not more than 8. The pH value of the pigment is determined by measuring the pH of a 10% by weight aqueous dispersion of the pigment. Examples of the pigment are, for instance, silicic acid anhydride (colloidal silica), kaolinite clay, calcined kaolinite clay, pyrophyllite, hydrated halloysite, sericite clay, sericite, talc, titanium oxide, and the like. When a pigment having more than pH 8 such as calcium carbonate, aluminum silicate, calcium silicate or aluminum hydroxide is employed, the stability of aqueous coating solution lowers, a pot life of the coating solution shortens upon employing together with a cross-linking agent, and the smoothness and color density of the recording paper become remarkably poor.

It is preferable that the amount of the pigment is from 5 to 300 parts by weight, more preferably 5 to 100 parts by weight, based on 100 parts by weight of the acetoacetyl group-containing PVA. When the amount is less than 5 parts by weight, the sticking occurs, and on the other hand, when the amount is more than 300 parts by weight, the color density and the plasticizer resistance become remarkably poor.

When the paper coating composition of the invention is applied to heat sensitive recording papers, the paper coating composition is coated onto a heat sensitive layer composed of a color forming material, a color developing material and a binder to form a protective layer, and also the paper coating composition is employed as a binder in the heat sensitive layer, but the former is more efficient than the latter in order to obtain the effect of the invention.

The process in which the coating composition is employed as the protective layer is concretely explained.

When a coating solution for forming the heat sensitive layer is prepared, an aqueous dispersion of the color forming material and an aqueous dispersion of the color developing material are respectively prepared, the aqueous dispersions are finely pulverized by thoroughly stirring, and then the dispersions are mixed and stirred to give a uniform costing disperison.

It is preferable that the amounts of the color forming material and color developing material are from 3 to 20 parts by weight and from 10 to 60 parts by weight, respectively, based on 100 parts by weight (whole solid matters) of coating dispersion.

A binder is added to at least one of the aqueous dispersion of the color forming material and the aqueous dispersion of the color developing material. It is preferable that the amount of the binder is from 10 to 200% by weight based on the total amount of the color forming material and the color developing material. The solid content of the coating dispersion is selected from the range of 10 to 40% by weight, from the point of workability. Examples of the binder employed in the present invention are, for instance, a PVA, a modified PVA such as carboxyl group-containing PVA, a acetoacetyl group-containing PVA, a methyl cellulose, a carboxymethyl cellulose, a starch, a latex, and the like.

Examples of the color forming material used in the invention are, for instance, a leuco form of a triphenylmethane dye such as 3,3-bis(p-dimethylaminophenyl)-phthalide, 3,3-bis(p-dimethylaminophenyl)-6-dimethylaminophthalide [Crystal Violet lactone], 3,3-bi(p-dimethylaminophenyl)-6-diethylaminophthalide, 3,3-bis(p-dimethylaminophenyl)-6-chlorophthalide, 3-dimethylamino-6-methoxyfluoran, 7-acetoamino-3-diethylaminofluoran, 3-diethylamino-5,7-dimethylfluoran, 3,6-bis-$\beta$-methoxyethyoxyfluoran, or 3,6-bis-$\beta$-cyanoethoxyfluoran, and the like, but the color forming materials are not limited thereto.

The color developing material employed in the invention includes a compound which reacts with the above-mentioned color forming material by heating and which is changeable to liquid or gaseous state at more than room temperature, preferably at more than 70° C. Examples of the color developing material are, for instance, phenol, p-methylphenol, p-tert-butylphenol, p-phenylphenol, $\alpha$-naphthol, $\beta$-naphthol, 4,4'-isopropylidenediphenol[bisphenol A], 4,4'-secondarybutylidenediphenol, 4,4'-cyclohexylidenediphenol, 4,4'-isopropylidenebis-(2-tert-butylphenol), 4,4'-(1-methyl-n-hexylidene)-diphenol, 4,4'-isopropylidenedicatechol, 4,4'-pentylidenediphenol, 4,4'-isopropylidenebis-(2-chlorophenol), phenyl-4-hydroxybenzoate, salicylic acid, 3-phenylsalicylic acid, 5-methylsalicylic acid, 3,5-di-tert-butylsalicylic acid, 1-oxy-2-naphthoic acid, m-hydroxybenzoic acid, 4-hydroxyphthalic acid, gallic acid, and the like, but the color developing material are not limited thereto.

A paper on which the boating dispersion is coated is not particularly limited and optional papers can be employed. When the coating dispersion is coated on the paper, conventional and optional methods such as a roll coating method, and air-knife coating method and a blade coating method can be carried out. It is preferably that a quantity(net)for application of the coating dispersion is from about 1 to about 20 g/m$^2$, more preferably from about 3 to about 10 g/m$^2$.

The paper coating composition of the invention is coated on the thus obtained heat sensitive layer as a protective layer. In coating, any methods such as a roll coating method, an air-knife coating method and a blade coating method can be adopted. It is preferable that the concentration of the paper coating composition is from 1 to 10% by weight from the point of the workabiity. It is preferable that the quantity(net)for application of the paper coating composition is from about 0.5 to about 5 g/m$^2$. The desired coating layer is fromed by air-drying or lightly heating.

The acetoacetyl group-containing PVA of the invention may be admixed with various conventional auxiliaries. Also, the auxiliaries may be coated before or after coating of the acetoacetyl group-containing PVA. For instance, a conventional compound used for giving the water resistance to the aceoacetyl group-containing PVA e.g. glyoxal, methylolmelamine, pottassium persulfate, ammonium persulfate, sodium persulfate, a metal salt such as ferric chloride or magnesium chloride, ammonium chloride, formaline, glycine, a glycidyl ester, a gylcidyl ether, dimethylol urea, ketene dimer, boric acid or borax is employed, whereby the water resistance of the obtained paper is extremely increased without making dirty the thermal print head. Also, conventional additives, e.g. a thermoplastic substance such as higher fatty acid amide, a filler such as calcium carbonate or titanium dioxide and a dispersing agent may be optionally employed.

Next, the case where the paper coating composition is employed as a binder in the heat sensitive layer of the heat sensitive recording paper is explained.

When a coating dispersin for forming the heat sensitive layer is prepared by employing the paper coating composition of the invention as a binder, an aqueous dispersion of a color forming material and an aqueous dispersion of a color developing material are prepared respectively, the aqueous dispersions are finely pulverized by thoroughly stirring, and then the dispersions are mixed and stirred to give a uniform coating dispersion. the acetoacetyl group-containing PVA is added to at least one of the dispersion of the color forming material and the dispersion of the color developing material. It is preferable that the amount of the acetoacetyl group-containing PVA is from 10 to 200% by weight based on the total amount of the color forming material and the color developing material. The solid contet of the caoting dispersion is selected from the range of 10 to 40% by weight, from the point of the workability.

there may be optically added a conventional compound used for giving the water resistance to the acetoacetyl group-containing PVA, e.g. glyoxal, methylolmelamine, pottassium persulfate, ammonium persulfate, sodium persulfate, a metal salt such as ferric chloride or magnesium chloride, or ammonium chloride, and moreover, a conventional additives, e.g. a thermoplastic substance such as a higher fatty acid amide, a filler such as calcium carbonate or titanium dioxide and the dispersing agent to the coating dispersion.

Also, as the binder, there are optionally mixed a PVA, a modified PVA such as carboxyl group-containing PVA, a methyl cellulose, carboxymethyl cellulose, starch, latex, and the like with the acetoacetyl group-containing PVA of the invention.

The paper on which the coating dispersion is coated is not particularly limited and optional papers can be employed. When the coating dispersion is coated on the paper, conventional and optional methods such as roll coating method, air-knife coating method or a blade coating method can be carried out. It is preferable that the amount of the coating dispersion is from 1 to 20 g/m², more preferably 3 to 10 g/m².

The paper coating composition of the present invention can be applied to optional papers such as a paper for information industry such as ink-jet recording paper, a pasteboard such as Manila board, white board or liner, a fine paper or a paper for printing such as photogravure paper.

Also, the paper coating composition of the invention can be applied to a composite composed of a substrate such as film, non-woven cloth or sheet as well as papers.

The present invention is more specifically described and explained by means of the following Examples in which all percents and parts are by weight unless otherwise noted. It is to be understood that the present invention is not limited to Examples, and various changes and modifications may be made in the invention without departing from the spirit and scope thereof.

EXAMPLE 1

[Preparation of acetoacetyl group-containing PVA]

There were mixed 100 parts of vinyl acetate, 50 parts of methanol and 40 parts of silicic acid anhydride (pH 6.3) and the mixture was polymerized in the presence of azobisisobutyronitrile as a polymerization initiator at 56° to 58° C. for 6 hours. The polymerization reaction was stopped at the time when the polymerization ratio is 75% and thereafter, methanol vapor was passed through the mixture in order to remove unpolymerized vinyl acetate to give a methanol solution of polyvinyl acetate.

The obtained methanol solution was subjected to hydrolysis reaction according to a conventional method to give a PVA having an average degree of hydrolysis of 98.5% by mole and an average degree of polymerization of 1,100.

A mixer was charged with 196 parts of the obtained PVA powder, and 16.8 parts of liquid diketene was added with spraying to the mixer for 30 minutes while stirring at 60 rpm. Then, the mixture was heated up to 60° C. and reacted for 3 hours to give an acetoacetyl group-containing PVA having a content of acetoacetyl group of 3.3% by mole. A proportion of the pigment to the acetoacetyl group-containing PVA is 100 parts of pigment to 100 parts of the PVA.

[Preparation of heat sensitive recording paper]

| Solution (A) | |
| --- | --- |
| Crystal Violet lactone | 10 parts |
| 5% Aqueous solution of PVA | 10 parts |
| Average degree of hydrolysis: 98% by mole | |

—continued

| [Preparation of heat sensitive recording paper] | |
| --- | --- |
| Average degree of polymerization: 1,100 | |
| Water | 15 parts |
| Solution (B) | |
| Bisphenol A | 50 parts |
| 5% Aqueous solution of PVA (the same PVA as the solution (A)) | 50 parts |
| Water | 75 parts |

The solutions (A) and (B) were respectively pulverized by employing a sand grinder until an average particle sizes of Crystal Violet lactone and bisphenol A were about 3μ, and then, the solution (A), the solution (B), 50 parts of calcium carboxide and 270 parts of 15% aqueous solution of PVA having the same average degree of hydrolysis and average degree of polymerization as solution (A) were mixed to give a coating solution.

The obtained coating solution was coated as a heat sensitive layer on a substrate having a basis weight of 50 g/m² so that a quantity net for application was 5.0 g/m² and it was dried.

Further, 10% aqueous solution of acetoacetyl group-containig PVA prepared in the presence of silicic acid anhydride was overcoated as a protective layer by employing a Dixon coater in a quantity for application of 5 g/m² (net), and it was air-dried to give a heat sensitive recording paper.

With respect to the obtained heat sensitive recording paper, the color density, the plasticizer resistance and the state of the thermal print head were estimated as follow:

[(1) Color density]

Printing is carried out by employing a heat-gradient tester (made by Kabushiki Kaisha Toyo Seiki Seisakusho) under a condition of a temperature of 120° C., a load of 2 kg/cm² and a time of 10 seconds, and a color density is measured by employing a densitometer (Model RD-100R, product of Macbeth Co., Ltd.) with use of an anber filter.

[(2) Plasticizer resistance]

The printed heat sensitive recording paper is interposed with soft polyvinyl chloride sheets and it is allowed to stand for 168 hours while adding a load of 20 g/cm². A percentage of a color density after 168 hours to an original color density is shown as a ratio of remained color.

[(3) State of thermal print head]

After striped pattern is printed on the sensitive recording paper of 100 m continuously by facsimile, the sticking or adhesiveness of resin dust is observed on the thermal print head.

The resuls are shown in Table 1.

COMPARATIVE EXAMPLE 2

The procedure of Example 1 was repeated except that a mixture of 100 parts of silicic acid anhydride (pH 6.3) and 100 parts of acetoacetyl group-containing PVA (a content of acetoacetyl group: 3.5% by mole, an average degree of hydrolysis: 98.5% by mole, an average degree of polymerization: 1,100) was employed instead of the 10 aqueous solution of acetoacetyl group-containing PVA prepared in the presence of silicic acid anhydride coated as a protective layer.

The results are shwn in Table 1.

EXAMPLES 2 TO 4 AND COMPARATIVE EXAMPLE 2

The procedure of Example 1 was repeated except that a coating solution shown in Table 1 was coated as a protective layer.

The results are shown in Table 1.

parts of 15% aqueous solution of the acetoacetyl group-containing PVA (the same PVA as the solutions (A) and (B) were mixed to give a coating solution.

The obtained coating solution was coated as a heat sensitive layer on a substrate having a basis weight of 50 g/m² so that a quantity for application after drying was 7.5 g/m² (net) and it was dried to give a heat sensitive recording paper.

TABLE 1

| | Protective layer | | | | | Thermal recording paper | | |
|---|---|---|---|---|---|---|---|---|
| | Pigment | | Acetoacetyl group-containing PVA | | | | | |
| | Kind | Content*¹ | Content of acetoacetyl group (% by mole) | Average degree of hydrolysis (% by mole) | Average degree of polymerization | Color density | Plasticizer resistance (Ratio of remained color %) | State of thermal print head*² |
| Ex. 1 | Silicic acid anhydride (pH 6.3) | 100 | 3.3 | 98.5 | 1,100 | 1.53 | 100 | ◎ |
| Ex. 2 | Kaolinite clay (pH 7) | 200 | 6.0 | 88.0 | 1,800 | 1.49 | 100 | ◎ |
| Ex. 3 | Pyrophellite (pH 6.5) | 150 | 4.5 | 95.0 | 800 | 1.51 | 100 | ◎ |
| Ex. 4 | Sericite clay (pH 6.8) | 50 | 1.0 | 99.0 | 500 | 1.55 | 100 | ◎ |
| Com. Ex. 1 | Silicic acid anhydride (pH 6.3) | 100 | 3.5 | 98.5 | 1,100 | 1.37 | 89 | Δ |
| Com. Ex. 2 | Calcium carbonate (pH 9.5) | 50 | 1.5 | 88.0 | 500 | 1.35 | 93 | × |

*¹Part based on 100 parts of acetoacetyl group-containing PVA
*²Estimation:
◎ No sticking
Δ Considerable sticking
× Marked sticking

EXAMPLE 5

The acetoacetyl group-containing PVA prepared in Example 1 was employed as a binder to give a heat sensitive recording layer

| Solution (A) | |
|---|---|
| Crystal Violet lactone | 10 parts |
| 5% Aqueous solution of the acetoacetyl group-containing PVA prepared in Example 1 | 10 parts |
| Water | 15 parts |
| Solution (B) | |
| Bisphenol A | 50 parts |
| 5% Aqueous solution of the acetoacetyl group-containing PVA prepared in Example 1 | 50 parts |
| Water | 75 parts |

The solutions (A) and (B) were respectively pulverized by employing a sand grinder until an average particle size of Crystal Violet lactone and bisphenol A about $3\mu$, and then, the solution (A), the solution (B) and 500 parts of 15% aqueous solution of the acetoacetyl group-containing PVA (the same PVA as the solutions (A) and (B)) were mixed to give a coating solution.

The obtained heat sensitive recording paper was overcoated in the same manner as in Example 1 and its properties were estimated.

The obtained heat sensitive recording paper had a color density of 1.55, a plasticizer resistance of 100 and a state of the thermal print head of ◎ .

What we claim is:

1. A paper coating composition comprising polyvinyl alcohol resin containing acetoacetyl group prepared by polymerizing vinyl acetate in the presence of a pigment having not more than pH 8 and then, hydrolysing the obtained polyvinyl acetate.

2. The paper coating composition of claim 1, which is employed for processing a heat sensitive recording paper.

3. The paper coating composition of claim 1, which is employed for forming a protective layer coated on a heat sensitive layer containing a color forming material and a color developing material reacting with said color forming material by heating.

* * * * *